(12) United States Patent
Yao (10) Patent No.: US 10,048,169 B2
(45) Date of Patent: Aug. 14, 2018

(54) CLIMBING TEST BENCH FOR SCOOTERS

(71) Applicant: ZHEJIANG LINIX MOTOR CO., LTD., Dongyang, Zhejiang (CN)

(72) Inventor: Jin Yao, Zhejiang (CN)

(73) Assignee: ZHEJIANG LINIX MOTOR CO., LTD., Dongyang, Zhejiang (CN)

( * ) Notice: Subject to any disclaimer, the term of this patent is extended or adjusted under 35 U.S.C. 154(b) by 81 days.

(21) Appl. No.: 15/168,050

(22) Filed: May 29, 2016

(65) Prior Publication Data

US 2017/0115184 A1    Apr. 27, 2017

(30) Foreign Application Priority Data

Oct. 27, 2015  (CN) .......................... 2015 1 0707070

(51) Int. Cl.
*G01M 17/007*    (2006.01)

(52) U.S. Cl.
CPC .... *G01M 17/0074* (2013.01); *G01M 17/0076* (2013.01)

(58) Field of Classification Search
USPC ......................................... 73/116.01, 118.01
See application file for complete search history.

(56) References Cited

U.S. PATENT DOCUMENTS

| | | | |
|---|---|---|---|
| 4,285,514 A * | 8/1981 | Romero ................. | A63C 19/10 14/69.5 |
| 4,913,615 A * | 4/1990 | Ward ........................ | B60P 1/43 14/69.5 |
| 6,695,707 B1 * | 2/2004 | Fernandez ............. | A63C 19/10 14/69.5 |
| 6,921,339 B1 * | 7/2005 | Martin ................... | A63C 19/10 14/69.5 |
| 8,690,695 B1 * | 4/2014 | Pittman .................. | A63C 19/08 108/147.21 |
| 9,561,448 B1 * | 2/2017 | Bethers .................. | A63C 19/10 |
| 2005/0129490 A1 * | 6/2005 | Hutchins ............... | B60P 1/4414 414/462 |
| 2006/0104771 A1 * | 5/2006 | Chapman ................. | B60S 9/12 414/537 |
| 2007/0095560 A1 * | 5/2007 | Lubanski ............. | H02G 3/0418 174/135 |
| 2007/0289073 A1 * | 12/2007 | Williams ............... | B65G 69/30 14/69.5 |

(Continued)

*Primary Examiner* — Eric S McCall
(74) *Attorney, Agent, or Firm* — Global IP Services; Tianhua Gu (57) ABSTRACT

The present invention discloses a climbing test bench for scooters, comprising a middle bridge arranged horizontally and above the ground and a first skew bridge and a second skew bridge which are arranged at both ends of the middle bridge; an upper end of the first skew bridge is hinged with one end of the middle bridge, an upper end of the second skew bridge is hinged with the other end of the middle bridge, a lower end of the first skew bridge and a lower end of the second skew bridge are in contact with the ground, respectively; and a lifting device is arranged below the middle bridge, and the lifting device may drive the middle bridge to rise and fall so that the first skew bridge and the second skew bridge form different tilt angles. Due to light weight of a scooter, it is not desired to provide a truss-frame structure. The arrangement of a lifting device can ensure the stability of the present invention.

10 Claims, 4 Drawing Sheets

(56) References Cited

U.S. PATENT DOCUMENTS

| | | | | |
|---|---|---|---|---|
| 2008/0056873 A1* | 3/2008 | Cullum | ................. | B60P 1/6454 |
| | | | | 414/563 |
| 2013/0193392 A1* | 8/2013 | McGinn | ................. | B66F 7/065 |
| | | | | 254/93 R |
| 2014/0154035 A1* | 6/2014 | Walker | .................... | B60P 1/435 |
| | | | | 414/537 |
| 2014/0189966 A1* | 7/2014 | Ricci | ..................... | E01D 15/124 |
| | | | | 14/69.5 |
| 2014/0237739 A1* | 8/2014 | Thompson | .............. | A63C 19/10 |
| | | | | 14/2.4 |
| 2014/0248109 A1* | 9/2014 | Johnson | ................. | A61G 3/061 |
| | | | | 414/537 |
| 2015/0050109 A1* | 2/2015 | Michaud | ................. | B60P 1/431 |
| | | | | 414/523 |
| 2015/0074925 A1* | 3/2015 | Levi | ....................... | B65G 69/30 |
| | | | | 14/72.5 |
| 2016/0332827 A1* | 11/2016 | Leibowitz | ............. | E01D 15/124 |
| 2017/0022017 A1* | 1/2017 | Lopez | .................... | B65G 69/30 |

* cited by examiner

CLIMBING TEST BENCH FOR SCOOTERS

TECHNICAL FIELD OF THE INVENTION

The present invention relates to a device for testing the performance of scooters, and in particular to a climbing test bench for scooters.

BACKGROUND OF THE INVENTION

After a scooter is produced and assembled, it is desired to perform a number of performance tests, including a climbing test on the scooter prior to put it into market. Due to possible damage to a housing or wheels of a scooter caused when performing a climbing test on the scooter outdoor, it is desired to construct a climbing bench to perform a climbing test on the scooter. However, because a test with only one slope can be performed by the existing climbing bench, it is required to construct a plurality of climbing benches to perform a climbing test with multiple slopes, resulting in high cost and occupying a large space of the workshop.

Electric scooters are used especially by the elderly, and different from road conditions for automobiles, the electric scooters are applicable to road conditions such as less bumps and small climbing gradient. Furthermore, to prevent a battery from discharging an extraordinary current, to reduce impact damage to the battery and to guarantee the endurance and service life of the battery, a scooter driver will not choose to accelerate when in climbing, whereas an automobile driver will choose to step on the accelerator pedal when in climbing due to the heavy weight of the automobile. Therefore, an indoor climbing test bench for automobiles does not apply to an electric scooter. Furthermore, since the climbing test bench for automobiles is large, more time is required for testing. For some climbing test benches for automobiles, multiple steps are provided as the climbing arrangement. As a result, it may be impossible for a scooter with smaller wheels to climb up the climbing test bench for automobiles.

SUMMARY OF THE INVENTION

An objective of the present invention is to provide a climbing test bench for scooters, which is applicable to scooters and by which a climbing test with a plurality of climbing angles may be performed.

To achieve this objective, the present invention adopts the following technical solution. A climbing test bench for scooters is provided, including: a middle bridge arranged horizontally and above the ground and a first skew bridge and a second skew bridge which are arranged at both ends of the middle bridge; an upper end of the first skew bridge is hinged with one end of the middle bridge, an upper end of the second skew bridge is hinged with the other end of the middle bridge, and a lower end of the first skew bridge and a lower end of the second skew bridge are in contact with the ground, respectively; and a lifting device is arranged below the middle bridge, and the lifting device may drive the middle bridge to rise and fall so that the first skew bridge and the second skew bridge form different tilt angles.

Due to lighter weight of a scooter, it is not desired to provide a truss-frame structure among the middle bridge, the first skew bridge and the second skew bridge. The arrangement of a lifting device can ensure the stability of the present invention. The first skew bridge and the second skew bridge are hinged with two ends of the middle bridge, respectively, and different tilt angles of the first skew bridge and the second skew bridge may be obtained by changing the height of the middle bridge. An inspector can control the rise and fall of the middle bridge by the lifting device to enable the first skew bridge and the second skew bridge on front and back sides of the middle bridge to form different tilt angles, so as to make it possible to perform different climbing tests on scooters at different angles. If the length of the first skew bridge differs from the length of the second skew bridge, two different tilt angles may be obtained; and if the length of the first skew bridge and the length of the second skew bridge are the same, the scooter can climb from a skew bridge on either side after determining a tilt angle.

Preferably, the lifting device is provided with a base; gantry frames are provided on both sides of the middle bridge, respectively, and lower ends of two columns of the gantry frames are fixed to the base or to the ground; a number of positioning pinholes which are spaced apart up and down are provided on the two columns of the gantry frames, respectively, and each of the columns is provided with one positioning pin which can be inserted into the positioning pinholes; and an end of the positioning pin can be inserted into a positioning pinhole to resist against a lower side surface of the middle bridge and confine the middle bridge to a height corresponding to the positioning pinhole. The support of the lifting device and the coordination of the positioning pins and the positioning pinholes on the gantry frames provide dual protection to the present invention and ensure the structural stability of the present invention. The lifting distance of the lifting device and the coordination of the positioning pins and the positioning pinholes on the gantry frames can provide dual positioning to the height of the middle bridge. The tilt angles can be determined by the height of the positioning pinholes and the length of the first skew bridge and the length of the second skew bridge, that is, each positioning pinhole can represent a tilt angle. When it is planned to perform a climbing test at a certain angle, the middle bridge is lifted to a positioning pinhole matched with this angle.

Preferably, a number of pulleys that are in contact with the ground are provided at a lower end of the first skew bridge and a lower end of the second skew bridge. The pulleys are arranged at the lower end of the first skew bridge and the lower end of the second skew bridge, and a lower end of the first approach bridge and a lower end of the second approach bridge are not in direct contact with the ground, so that the middle bridge enables the first skew bridge and the second skew bridge to form different tilt angles; and the arrangement of the pulleys can also prevent the first skew bridge and the second skew bridge from scraping the floor of the workshop.

Preferably, the lower end of the first skew bridge is connected to the first approach bridge, and the lower end of the second skew bridge is connected to the second approach bridge; one end of the first approach bridge is hinged with the lower end of the first skew bridge, and the other end thereof is in contact with the ground; and one end of the second approach bridge is hinged with the lower end of the second skew bridge, and the other end thereof is in contact with the ground. The lower end of the first approach bridge and the lower end of the second approach bridge are not in direct contact with the ground, so that the lower end of the first skew bridge and the lower end of the second skew bridge have a certain height from the ground, respectively; and due to smaller wheels and lower speed of a scooter, if a scooter directly runs to the first skew bridge or the second skew bridge, it is easy to make the scooter fail to climb up or get bumpy even if it climbs up, which is not beneficial to a climbing test for the scooter. The arrangement of the first approach bridge and the second approach bridge can deal with this problem.

Preferably, the first approach bridge is hinged with the lower end of the first skew bridge and forms a first lower movable joint, and the second approach bridge is hinged with the lower end of the second skew bridge and forms a second lower movable joint; the first lower movable joint includes a first tubular lower sleeve that is sleeved on a hinge shaft of the first lower movable joint; the deck of the first approach bridge is extended onto the first lower sleeve and forms a first approach bridge deck extension, and the first approach bridge deck extension forms a first curved structure matched with an upper surface of the first lower sleeve; the deck at the lower end of the first skew bridge is extended onto the first lower sleeve and forms a first lower bridge deck extension, and the first lower bridge deck extension forms a third curved structure matched with a surface of the first lower sleeve; the second lower movable joint includes a second tubular lower sleeve that is sleeved on the hinge shaft of the second lower movable joint; the deck of the second approach bridge is extended onto the second lower sleeve and forms a second approach bridge deck extension, and the second approach bridge deck extension forms a second curved structure matched with an upper surface of the second lower sleeve; and the deck at the lower end of the second skew bridge is extended onto the second lower sleeve and forms a second lower bridge deck extension, and the second lower bridge deck extension forms a fourth curved structure matched with a surface of the second lower sleeve. Because the tilt angle of the first approach bridge and the tilt angle of the second approach bridge are always not greater than the tilt angle of the first askew bridge and the tilt angle of the second skew bridge, there is a small step formed between the first skew bridge and the first approach bridge and between the second skew bridge and the second approach bridge, making it convenient for a scooter to run to the first skew bridge or the second skew bridge from the first approach bridge or the second approach bridge via the lower movable joints. By the above-mentioned arrangement of the present invention, no matter how large the tilt angle is, the first approach deck extension, the curved surface of the first lower sleeve of the first lower movable joint, and the first lower bridge deck extension form a curved round corner, and the second approach deck extension, the curved surface of the second lower sleeve of the second lower movable joint, and the second lower bridge deck extension form a curved round corner, thereby reducing the space between the first skew bridge and the first approach bridge and between the second skew bridge and the second approach bridge, and making it possible for wheels of a scooter to run over the lower movable joints so as to start performing a climbing test.

Preferably, the upper end of the first skew bridge is hinged with one end of the middle bridge and forms a first upper movable joint; the first upper movable joint includes a first tubular upper sleeve that is sleeved on a hinge shaft of the first upper movable joint; the deck on one side of the middle bridge is extended onto the first upper sleeve and forms a first middle bridge extension, and the first middle bridge extension forms a fifth curved structure matched with an upper surface of the first upper sleeve; the deck at the upper end of the first skew bridge is extended onto the first upper sleeve and forms a first upper bridge deck extension, and the first upper deck extension forms a sixth curved structure matched with a surface of the first upper sleeve; the upper end of the second skew bridge is hinged with the other end of the middle bridge and forms a second upper movable joint, and the second upper movable joint includes a second tubular upper sleeve that is sleeved on a hinge shaft of the second movable joint; the deck on the other side of the middle bridge is extended onto the second upper sleeve and forms a second middle bridge extension, and the second middle bridge extension forms a seventh curved structure matched with the upper surface of the second upper sleeve; the deck at the upper end of the second skew bridge is extended onto the second upper sleeve and forms a second upper bridge extension, and the second upper bridge extension forms an eighth curved structure matched with the surface of the second upper sleeve. Because of the presence of the first upper movable joint and the second upper movable joint, there is a small step formed between the first skew bridge and the middle bridge and between the second skew bridge and the middle bridge, making it convenient for a scooter to run to the middle bridge from the first skew bridge via the first upper movable joint, or run to the middle bridge from the second skew bridge via the second upper movable joint. By the above-mentioned arrangement of the present invention, the first middle bridge extension, the curved surface of the first upper sleeve of the first upper movable joint, and the first upper bridge deck extension form a curved round corner, and the second middle bridge extension, the curved surface of the second upper sleeve of the second upper movable joint, and the second upper bridge deck extension form a curved round corner, thereby reducing the space between the first skew bridge and the middle bridge and between the second skew bridge and the middle bridge, and making it possible for wheels of a scooter to run over the upper movable joints to complete the climbing test.

Preferably, the lifting device is a scissor hydraulic lifting platform, the hydraulic lifting platform is provided with at least two sets of scissors, and parallel joint pins are fixed between upper ends of adjacent scissors and between lower ends of adjacent scissors, respectively. The scissors of the scissor hydraulic lifting platform form an "X" structure which is more stable and can ensure the stability of the middle bridge above the lifting device; the hydraulic lifting platform is provided with at least two sets of scissors, and upper ends of the plurality of scissors and lower ends of the plurality of scissors can be fixedly connected to each other by joint pins, which can further ensure the stability of the present invention.

Preferably, the lower ends of the scissors of the hydraulic lifting platform are fixedly connected to the base, and the upper ends of the scissors are fixedly connected to the middle bridge. The hydraulic lifting platform includes a platform and a base, the middle bridge includes a middle bridge body and a middle bridge deck. The middle bridge deck may be arranged on an upper platform to form the middle bridge, or the upper platform is removed to connect the middle bridge body to lifting arms. Removing the middle bridge body or the upper platform can reduce the weight of the present invention, so that it is easier for the hydraulic lifting platform to drive the middle bridge to move up and down.

Preferably, side plates are provided on both sides of the lower ends of the first skew bridge and the second skew bridge, respectively, pulley shafts connected to the two ends and to the side plates are provided between the side plates of the first skew bridge and the side plates of the second skew bridge, and a number of pulleys which are spaced apart are fixed on the pulley shafts. The pulleys are coaxially fixed, and this can ensure the stability when the first skew bridge and the second skew bridge move.

Preferably, guardrails are provided on left and right sides of the first skew bridge, on left and right sides of the middle bridge and on left and right sides of the second skew bridge, respectively, and anti-skid strips are provided on the first skew bridge deck, the second skew bridge deck and the middle bridge deck.

The present invention applies to a climbing test for scooters, and by the present invention, a climbing test for scooters can be performed at a number of climbing angles. Furthermore, the stability of the present invention is relatively high.

DETAILED DESCRIPTION OF THE INVENTION

Figure 1:
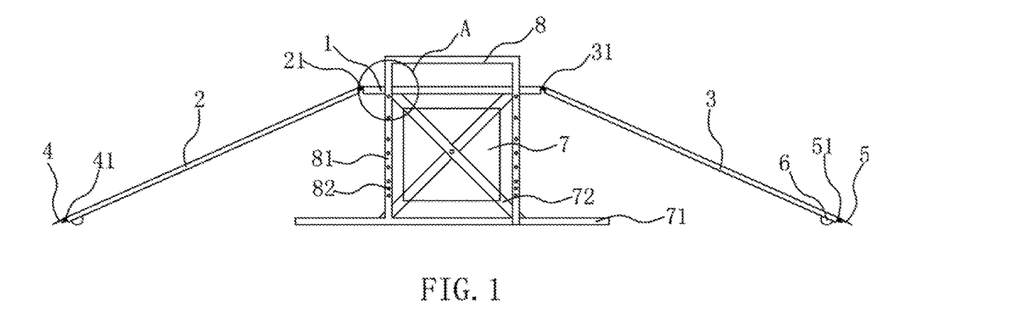
FIG. 1 is a schematic structure diagram of the present invention.

As shown in FIG. 1, a climbing test bench for scooters of the present invention includes: a middle bridge 1 arranged horizontally and above the ground and a first skew bridge 2 and a second skew bridge 3 which are arranged at both ends of the middle bridge 1; an upper end of the first skew bridge 2 is hinged with one end of the middle bridge 1, an upper end of the second skew bridge 3 is hinged with the other end of the middle bridge 1, a lower end of the first skew bridge 2 is in contact with the ground via a first approach bridge 4, and a lower end of the second skew bridge 3 is in contact with the ground via a second approach bridge 5; pulleys 6 that are in contact with the ground are provided at the lower end of the first skew bridge 2 and the lower end of the second skew bridge 3, respectively; and a lifting device 7 is provided below the middle bridge 1, and the lifting device 7 may drive the middle bridge 1 to rise and fall so that the first skew bridge 2 and the second skew bridge 3 form different tilt angles.

Figure 6:
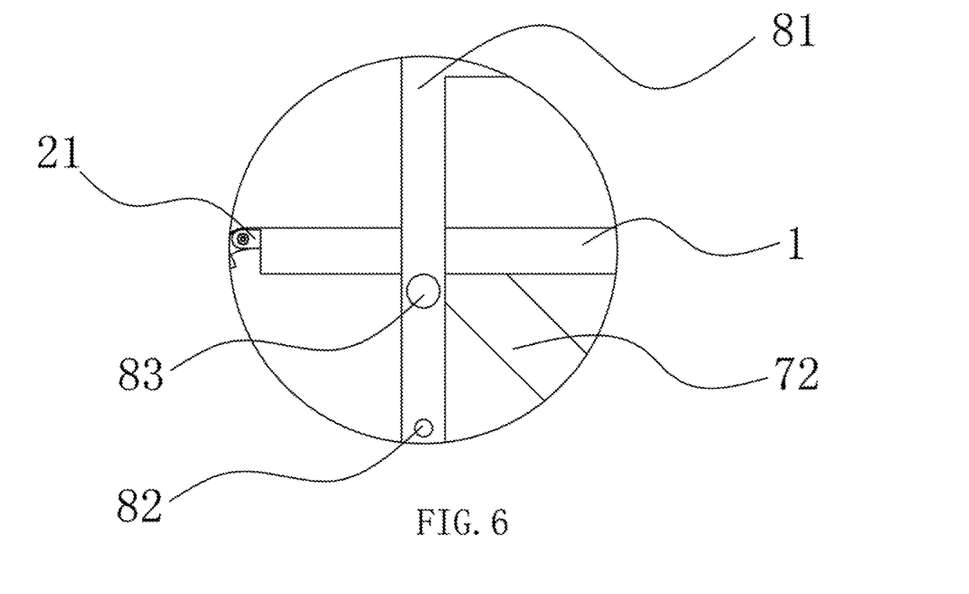
FIG. 6 is an enlarged view of part A of FIG. 1.

As shown in FIG. 1 and FIG. 6, the lifting device of the present invention is provided with a base 71 and an upper platform; gantry frames 8 are provided on both sides of the middle bridge 1, respectively, and the lower ends of two columns 81 of the gantry frames 8 are fixed to the base 71; eight positioning pinholes 82 which are spaced apart up and down are provided on the two columns 81 of the gantry frames 8, respectively, and each of the columns 81 is provided with one positioning pin 83 which can be inserted into the positioning pinholes 82; and an end of positioning pin 83 can be inserted into a positioning pinhole 82 to resist against a lower side surface of the middle bridge 1 and confine the middle bridge 1 to a height corresponding to the positioning pinhole 82.

Figure 7:
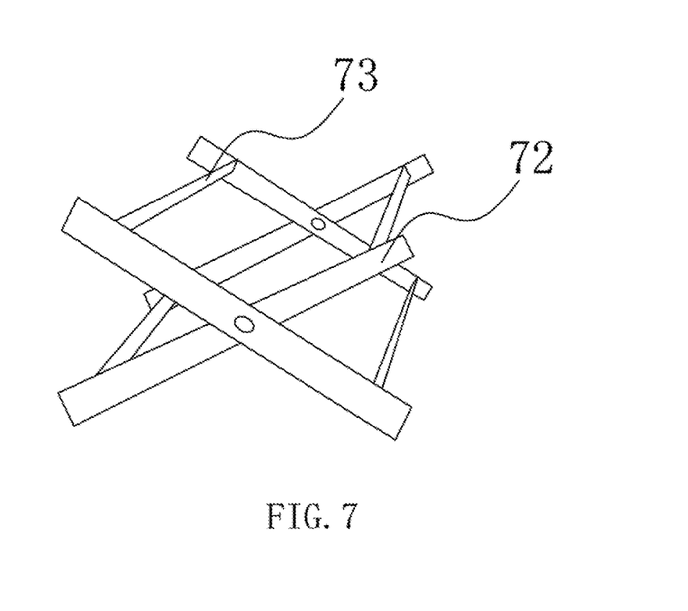
FIG. 7 is a schematic structure diagram of scissors of a lifting device according to the present invention.
Figure 8:
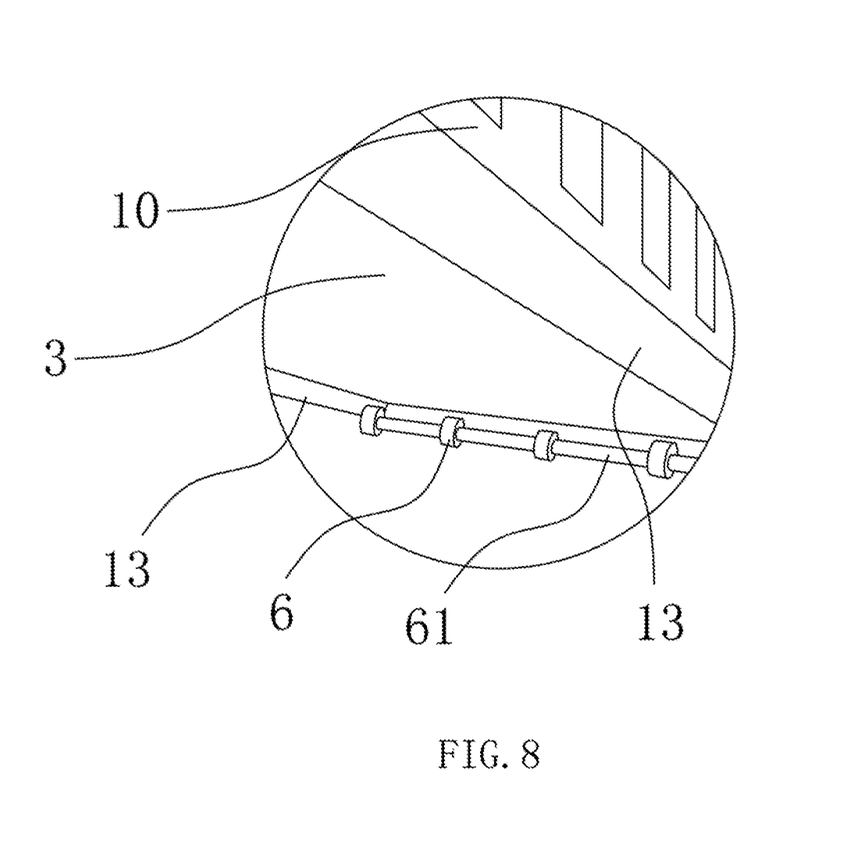
FIG. 8 is a schematic structure diagram of pulleys according to the present invention.

As shown in FIG. 1, FIG. 7 and FIG. 8, the lifting device 7 of the present invention is a scissor hydraulic lifting platform and is provided with at least two sets of scissors 72, and joint pins 73 are welded between the upper ends and between the lower ends of the two sets of scissors 72. The middle bridge 1 in the present invention includes a middle bridge body and a middle bridge deck, the first skew bridge 2 includes a first skew bridge body and a first skew bridge deck, and the second skew bridge 3 includes a second skew bridge body and a second skew bridge deck; and the middle bridge body is the upper platform of the lifting device. Guardrails 10 are provided on left and right sides of first skew bridge 2, on left and right sides of middle bridge 1 and on left and right sides of second skew bridge 3, respectively, and anti-skid strips are provided on the first skew bridge deck, the second skew bridge deck and the middle bridge deck. Side plates 13 on both sides, and pulleys shafts 61 positioned between the side plates 13 on both sides, are provided below the first skew bridge 2 and the second skew bridge 3; the two ends of the pulley shafts 61 are welded with the side plates 13 on both sides; and a number of pulleys 6 which can be in contact with the ground are fixed on the pulley shafts 61. Eight positioning pinholes 51 of the columns 81 of the gantry frames 8 in the present invention correspond, from bottom to top, to tilt angles 4°, 5°, 6°, 8°, 10°, 12°, 15° and 18°, respectively.

Figure 2:
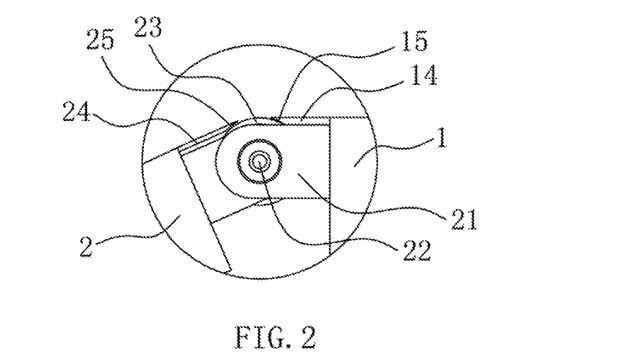
FIG. 2 is a schematic structure diagram of a first upper movable joint according to the present invention.
Figure 3:
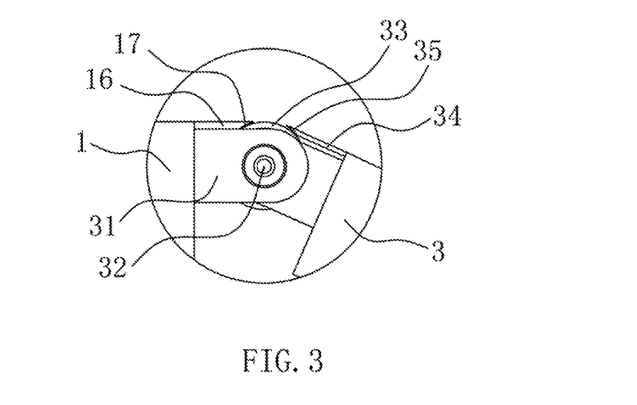
FIG. 3 is a schematic structure diagram of a second upper movable joint according to the present invention.

As shown in FIG. 1, FIG. 2, FIG. 3, the upper end of the first skew bridge 2 is hinged with one end of the middle bridge 1 and forms a first upper movable joint 21; and the first upper movable joint 21 includes a first tubular upper sleeve 23 that is sleeved on a hinge shaft 22 of the first upper movable joint. The deck on one side of the middle bridge 1 is extended onto the first upper sleeve and forms a first middle bridge extension 14, and the first middle bridge extension forms a fifth curved structure 15 matched with an upper surface of the first upper sleeve 23; the deck at the upper end of the first skew bridge 2 is extended onto the first upper sleeve 23 and forms a first upper bridge deck extension 24, and the first upper deck extension 24 forms a sixth curved structure 25 matched with a surface of the first upper sleeve 23. The upper end of the second skew bridge 3 is hinged with the other end of the middle bridge 1 and forms a second upper movable joint 31, and the second upper movable joint 31 includes a second tubular upper sleeve 33 that is sleeved on a hinge shaft 32 of the second upper movable joint; the deck on the other side of the middle bridge 1 is extended onto the second upper sleeve 33 and forms a second middle bridge extension 16, and the second middle bridge extension 16 forms a seventh curved structure 17 matched with the surface of the second upper sleeve 33; and the deck at the upper end of the second skew bridge 3 is extended onto the second upper sleeve 33 and forms a second upper bridge extension 34, and the second upper bridge extension 34 forms an eighth curved structure 35 matched with the surface of the second upper sleeve.

Figure 4:
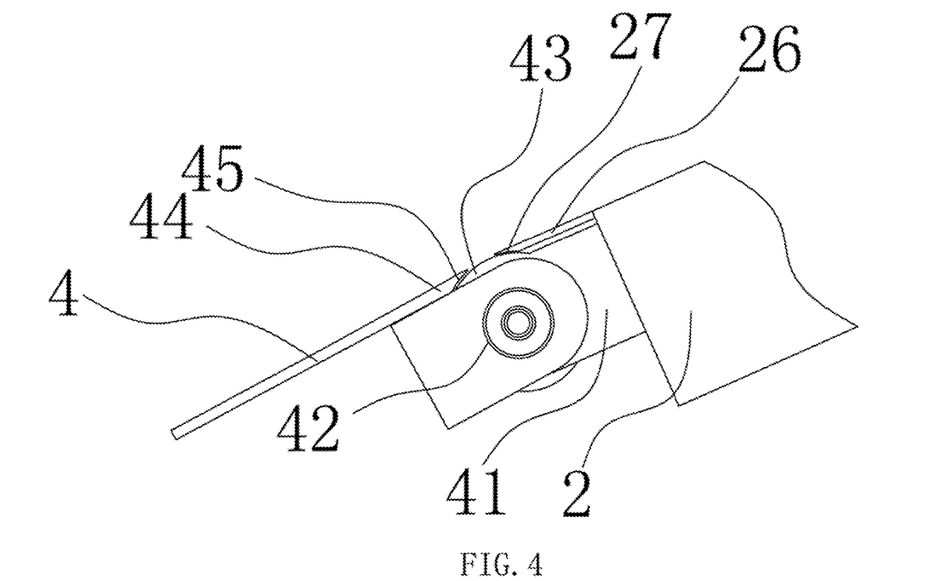
FIG. 4 is a schematic structure diagram of a first lower movable joint according to the present invention.
Figure 5:
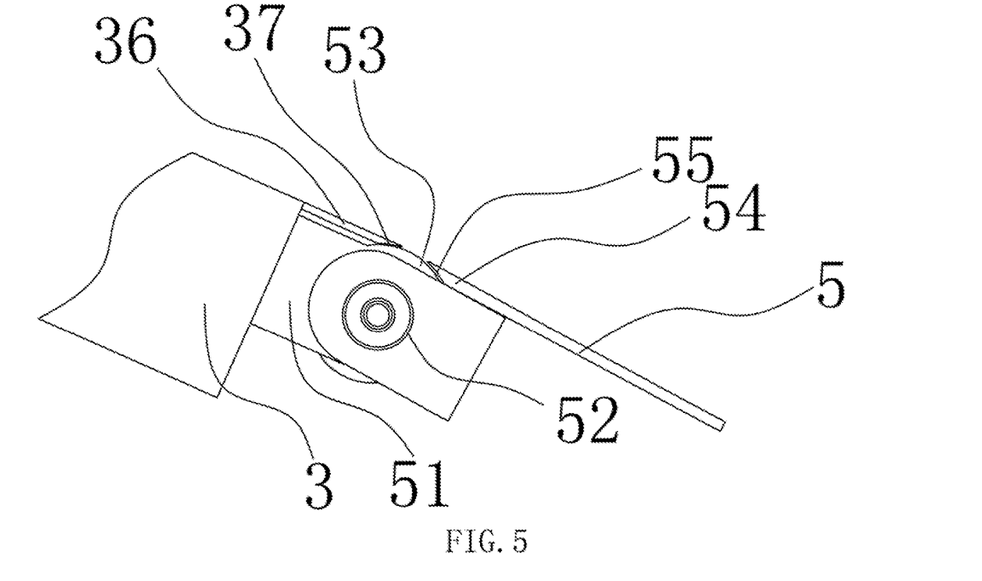
FIG. 5 is a schematic structure diagram of a second lower movable joint according to the present invention.

As shown in FIG. 1, FIG. 4 and FIG. 5, the first approach bridge 4 is hinged with the lower end of the first skew bridge 2 and forms a first lower movable joint 41, and the second approach bridge 5 is hinged with the lower end of the second skew bridge 3 and forms a second lower movable joint 51. The first lower movable joint 41 includes a first tubular lower sleeve 43 that is sleeved on a hinge shaft 42 of the first lower movable joint; the deck of the first approach bridge 4 is extended onto the first lower sleeve 43 and forms a first approach bridge deck extension 44, and the first approach bridge deck extension 44 forms a first curved structure 45 matched with an upper surface of the first lower sleeve 43;

the deck at the lower end of the first skew bridge 2 is extended onto the first lower sleeve 43 and forms a first lower bridge deck extension 26, and the first lower bridge deck extension 26 forms a third curved structure 27 matched with a surface of the first lower sleeve 43. The second lower movable joint 51 includes a second tubular lower sleeve 53 that is sleeved on the hinge shaft 52 of the second lower movable joint; the deck of the second approach bridge 5 is extended onto the second lower sleeve 53 and forms a second approach bridge deck extension 54, and the second approach bridge deck extension 54 forms a second curved structure 55 matched with an upper surface of the second lower sleeve 53; and the deck at the lower end of the second skew bridge 3 is extended onto the second lower sleeve 53 and forms a second lower bridge deck extension 36, and the second lower bridge deck extension 36 forms a fourth curved structure 37 matched with a surface of the second lower sleeve 53. The climbing test bench for scooters of the present invention is especially arranged in a workshop in which scooters are produced, and a terrace should be paved on the ground of the workshop to avoid damage to the wheels of scooters.

Before performing a climbing test on scooters, the hydraulic lifting platform is controlled to adjust the height of the middle bridge so as to get a specific tilt angle, and then climbing tests at this tilt angle are performed on a batch of scooters.

Because of the presence of the first movable joint and the second lower movable joint, there is a small step formed between the first skew bridge and the first approach bridge and between the second skew bridge and the second approach bridge, making it convenient for a scooter to run to the first skew bridge from the first approach bridge via the first lower movable joint, or run to the second skew bridge from the second approach bridge via the second lower movable joint. By the above-mentioned arrangement of the present invention, no matter how large the tilt angle is, the first approach deck extension, the curved surface of the first lower sleeve of the first lower movable joint, and the first lower bridge deck extension form a curved round corner, and the second approach deck extension, the curved surface of the second lower sleeve of the second lower movable joint, and the second lower bridge deck extension form a curved round corner, thereby reducing the space between the first skew bridge and the first approach bridge and between the second skew bridge and the second approach bridge, and making it possible for wheels of a scooter to run over the lower movable joints so as to start performing a climbing test.

Because of the presence of the first upper movable joint and the second upper movable joint, there is a small step formed between the first skew bridge and the second skew bridge, and the two ends of the middle bridge, respectively, making it convenient for a scooter to run to the middle bridge from the first skew bridge via the first upper movable joint, or run to the middle bridge from the second skew bridge via the second upper movable joint. By the above-mentioned arrangement of the present invention, the first middle bridge extension, the curved surface of the first upper sleeve of the first upper movable joint, and the first upper bridge deck extension form a curved round corner, and the second middle bridge extension, the curved surface of the second upper sleeve of the second upper movable joint, and the second upper bridge deck extension form a curved round corner, thereby reducing the space between the first skew bridge and the middle bridge and between the second skew bridge and the middle bridge, and making it possible for wheels of a scooter to run over the upper movable joints to complete the climbing test.

What is claimed is:

1. A climbing test bench for scooters comprising:
   a middle bridge arranged horizontally and above the ground;
   a first skew bridge and a second skew bridge arranged at both ends of the middle bridge, an upper end of the first skew bridge is hinged with one end of the middle bridge, an upper end of the second skew bridge is hinged with the other end of the middle bridge;
   a lifting device arranged below the middle bridge for driving the first skew bridge and the second skew bridge form different tilt angle;
   a first approach bridge hinged with a lower end of the first skew bridge by a first lower movable joint, and a second approach bridge hinged with a lower end of the second skew bridge by a second lower movable joint;
   the first lower movable joint comprises a first tubular lower sleeve and a first lower hinge shaft, the deck of the first approach bridge is extended onto the first lower sleeve to form a curved structure matching with an upper surface of the first lower sleeve, the deck at the lower end of the first skew bridge is extended onto the first lower sleeve to form a curved structure matched with a surface of the first lower sleeve; and
   the second lower movable joint comprises a second tubular lower sleeve and a second lower hinge shaft, the deck of the second approach bridge is extended onto the second sleeve to form a curved structure matched with an upper surface of the second lower sleeve, and the deck at the lower end of the second skew bridge is extended onto the second lower sleeve to form a curved structure matching with a surface of the second lower sleeve.

2. The climbing test bench for scooters according to claim 1, wherein the upper end of the first skew bridge is hinged with one end of the middle bridge by a first upper movable joint comprising a first upper sleeve and a first upper hinge shaft, the deck on one side of the middle bridge deck is extended onto the first upper sleeve to form a curved structure matched with an upper surface of the first upper sleeve, the deck at the upper end of the first skew bridge is extended onto the first upper sleeve to form a curved structure matched with a surface of the first upper sleeve, the upper end of the second skew bridge is hinged with the other end of the middle bridge by a second upper movable joint comparing a second upper sleeve and a second upper hinge shaft, the deck on the other side of the middle bridge deck is extended onto the second upper sleeve to form a curved structure matched with the surface of the second upper sleeve, the deck at the upper end of the second skew bridge deck is extended onto the second upper sleeve to form a curved structure matched with the surface of the second upper sleeve.

3. The climbing test bench for scooters according to claim 1, wherein guardrails are provided on left and right sides of the first skew bridge, on left and right sides of the middle bridge and on left and right sides of the second skew bridge respectively, and anti-skid strips are provided on the first skew bridge deck, the second skew bridge deck and the middle bridge deck.

4. The climbing test bench for scooters according to claim 1, wherein a number of pulleys that are in contact with the ground are provided at the lower end of the first skew bridge and the lower end of the second skew bridge, respectively.

5. The climbing test bench for scooters according to claim 4, wherein side plates are provided on both sides of the lower ends of the first skew bridge and the second skew bridge; respectively, pulley shafts are provided between the side plates of the first skew bridge and the side plates of the second skew bridge, and a number of pulleys which are spaced apart are fixed on the pulley shafts.

6. The climbing test bench for scooters according to claim 1, wherein the lifting device is provided with a base, gantry frames are provided on both sides of the middle bridge respectively, lower ends of two columns of the gantry frames are fixed to the base or to the ground, a number of positioning pinholes which are spaced apart up and down are provided on two columns of the gantry frames respectively, each of the two columns is provided with one positioning pin which is inserted into the positioning pinholes to resist against a lower side surface of the middle bridge and to confine the middle bridge to a height.

7. The climbing test bench for scooters according to claim 6, wherein a number of pulleys that are in contact with the ground are provided at the lower end of the first skew bridge and the lower end of the second skew bridge, respectively.

8. The climbing test bench for scooters according to claim 7, wherein side plates are provided on both sides of the lower ends of the first skew bridge and the second skew bridge; respectively, pulley shafts are provided between the side plates of the first skew bridge and the side plates of the second skew bridge, and a number of pulleys which are spaced apart are fixed on the pulley shafts.

9. The climbing test bench for scooters according to claim 6, wherein the lifting device is a scissor hydraulic lifting platform, the hydraulic lifting platform is provided with at least two sets of scissors, and parallel joint pins are fixed between upper ends of adjacent scissors and between lower ends of adjacent scissors respectively.

10. The climbing test bench for scooters according to claim 9, wherein the lower ends of the scissors of the hydraulic lifting platform are fixedly connected to the base, and the upper ends of the scissors are fixedly connected to the middle bridge.

* * * * *